United States Patent Office 3,412,083
Patented Nov. 19, 1968

3,412,083
AZAURIDINE DERIVATIVES
Albert Robert Restivo, Belleville, N.J., assignor to E. R. Squibb & Sons, Inc., New York, N.Y., a corporation of Delaware
No Drawing. Continuation-in-part of application Ser. No. 247,816, Dec. 28, 1962. This application Apr. 17, 1967, Ser. No. 631,162
10 Claims. (Cl. 260—211.5)

ABSTRACT OF THE DISCLOSURE

This invention relates to the new chemical compounds, the 3-substituted-2-ribofuranosyl-as-triazin-5(2H) - ones (i.e., 3-substituted azauridines), which are useful as disinfectants and as antibacterial agents. The compounds are prepared by treating a 3-substituted-mercapto-2-tri-O-benzoylribofuranosyl-as-triazin-5(2H)-one with ammonia or halogen to yield the corresponding 3-substituted final products. Alternatively, the final products can be formed by treating a 3-substituted-thio-as-triazin-5(2H)-one with an amine, ammonia or halogen to yield the 3-substituted-as-triazin-5(2H)-one, then with a mercuric salt to yield the corresponding 2-mercuri derivative, then with tri-O-benzoyl-D-ribofuranosyl chloride to yield the corresponding 2-tri-O-benzoylribofuranosyl derivative, and finally with a strong base to yield the final product.

---

This application is a continuation-in-part of my application, Ser. No. 247,816, filed Dec. 28, 1962, now abandoned.

This invention relates to the synthesis of new heterocyclic organic compounds. More particularly, this invention relates to the synthesis of new 3-substituted 2-ribofuranosyl-as-triazin-5(2H)-ones (i.e., 3-substituted azauridines) which may be represented by the following formula

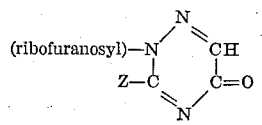

wherein Z may represent halogen (e.g., chloro or bromo), amino, furfurylamino, morpholino or piperidino.

It is an object of this invention to prepare new 3-substituted azauridine derivatives and more particularly to prepare these derivatives by a new and improved method, which entails the preparation of new intermediates and leads to the production of the desired products.

The new azauridine derivatives and the intermediates therefor (particularly the mercuri intermediates) in aqueous solution or suspension possess antibacterial activity and can be used as disinfectants. For this purpose they are dissolved or suspended in water, preferably also containing a detergent, at a concentration of about 0.5% to about 5% and may be used as washes to disinfect walls and floors.

The objects of this invention may be accomplished by various methods. The general and preferred method involves the employment of a compound of the Formula I

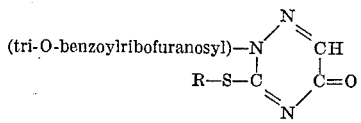

wherein R is a hydrocarbon radical of less than twelve carbon atoms, such as alkyl, preferably lower alkyl (e.g., methyl, ethyl, propyl, butyl, amyl, and hexyl); aralkyl, preferably monocyclic aryl lower alkyl (e.g., benzyl, phenethyl, β-phenylpropyl, and o, m or p-tolylethyl); alkenyl, preferably lower alkenyl (e.g., allyl); aralkenyl, preferably monocyclic aryl lower alkenyl (e.g., cinnamyl) and cycloalkyl (e.g., cyclopropyl and cyclohexyl), as a starting material.

The starting material of Formula I may be prepared in accordance with the procedures set forth in my application, Ser. No. 39,768, filed June 30, 1960, and now U.S. Patent No. 3,135,737.

The desired products of this invention may be obtained by treating the starting material of Formula I with an ammonia gas or halogen gas in a cold, methanol solution. It has been surprisingly found by this procedure that the 3-R-S radical is removed from the thiazinyl nucleus and replaced by the respective reagent employed, i.e., $NH_2$ or halogen, while debenzoylation simultaneously takes place at the 2-position to yield the desired new 3-substituted-2-ribofuranosyl-as-triazin-5(2H)-ones, i.e., 3-amino or 3-halo-azauridines.

In an alternative method which may be employed in the production of the new compounds of this invention, a tautomeric compound of the Formula II

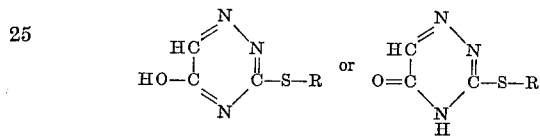

wherein R is as hereinbefore defined, may first be treated to replace the 3-R-S radical, as by reaction with morpholine, piperidine, furfurylamine, ammonia, or a halogen (e.g., chlorine or bromine) to yield the respective 3-substituted intermediates, which are also new compounds of this invention.

The starting material of Formula II may also be prepared in accordance with the procedures set forth in said U.S. Patent No. 3,135,737.

The new 3-substituted intermediates may then be reacted with a mercuric salt, preferably derived from an acid such as the hydrohalic acids (e.g., hydrochloric and hydrobromic acids), nitric acid, sulfuric acid and organic acids, such as the lower alkanoic acids (e.g., acetic, propionic and butyric acids) and aromatic acids (e.g., benzoic and o, m and p-toluic acids) to form a new compound of the Formula III

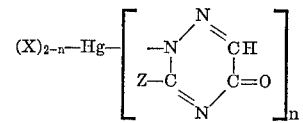

wherein Z is halogen, amino, furfurylamino, morpholino or piperidino, X is the anion of the mercuric acid salt and n is the integer one or two.

The reaction is preferably conducted in an inert solvent medium, such as the lower alkanols (e.g., methanol and ethanol) and dimethylformamide. Reaction speed may be increased by warming the solution of the two reactants, but reaction will occur at room temperature. The ratio of reactants will determine the nature of the reaction product to the extent that if two moles of the triazine are employed for each mole of the mercuric salt, the reaction product will contain two moles of the triazinyl moiety (a compound of Formula III wherein n is equal to 2) whereas if a one to one ratio is employed, the reaction product will be a mercuric acid salt of Formula III wherein n is equal to one.

A compound of Formula III is next reacted with a tri-O- benzoyl-D-ribofuranosyl chloride to yield a new compound of the Formula IV:

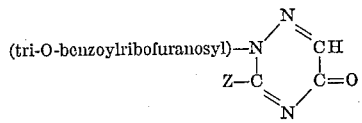

wherein Z is as hereinbefore defined. The reaction is conducted in a solvent medium and preferably under reflux conditions. Suitable solvents are non-polar solvents such as the aromatic hydrocarbons (e.g., benzene and toluene). The reaction product is isolated from the liquid portion of the reaction mixture by filtration and concentration of the filtrate.

Compounds of the Formula IV may then be converted to the desired 3-substituted azauridines of this invention by hydrolysis with a strong base, such as anhydrous ammonia or sodium methoxide, which hydrolysis results in debenzoylation at the 2-position to yield the desired products.

The following examples are presented to more fully illustrate the invention, all temperatures being expressed in degrees centigrade.

Example 1.—3 - amino-2-ribofuranosyl-as-triazin-5-(2H)-one

A solution of about 5 g. of amorphous and impure 3-methylthio-2-(tri-O-benzoylribofuranosyl)-as-triazin - 5-(2H)-one in 250 ml. of methanol is saturated at 0–5° with $NH_3$ gas. The batch is allowed to reach room temperature where it is held for 4 days. Concentration of the mixture to a volume of 100 ml., followed by filtration leads to 550 mg. of crude 3-amino-2-ribofuranosyl-as-triazin-5-(2H)-one. Purification is accomplished by dissolving the crude material in 12 ml. of 10% HCl, decolorization of the solution with activated charcoal and finally neutralization to pH 8.4 with 28% aqueous $NH_3$. The crystals weigh 425 mg., M.P. 243–245° decomp. (with pre-darkening).

Analysis.—Calc'd for $C_8H_{12}N_4O_5$: C, 39.34; H, 4.95; N, 22.94. Found: C, 39.46; H, 5.04; N, 23.05.

Example 2.—3-chloro-2-ribofuranosyl-as-triazin-5(2H)-one

Following the procedure set forth in Example 1 but substituting an equivalent amount of chlorine gas for ammonia gas yields 3-chloro-2-ribofuranosyl-as-triazin-5(2H)-one.

Similarly, following the procedure set forth in Example 1 but substituting an equivalent amount of bromine gas for ammonia gas there is obtained 3-bromo-2-ribofuranosyl-as-triazin-5(2H)-one.

Example 3.—3-(furfurylamino)-as-triazin-5(4H)-one

A mixture of 1.79 g. of 3-(methylthio)-as-triazin-5(4H)-one and 5.0 g. of furfurylamine is heated at 95–100° for 90 minutes. On cooling the material is filtered and washed with acetone to yield a first crop of 1.75 g. of 3-furfurylamino-as-triazin-5(4H)-one having a melting point of about 260–261° and a second crop of 0.2 g. having a melting point of about 254–255°.

Analysis.—Calc'd for $C_6H_8N_4O_2$: C, 49.99; H, 4.20; N, 29.16. Found: C, 50.51; H, 4.02; N, 29.78.

Example 4.—3-(piperidino)-as-triazin-5(4H)-one

Following the procedure set forth in Example 3 but substituting an equivalent amount of piperidine for furfurylamine yields 3-(piperidino)-as-triazin-5(4H)-one.

Similarly, following the procedure set forth in Example 3 but substituting an equivalent amount of morpholine for furfurylamine yields 3-(morpholino)-as-triazin - 5(4H)-one.

Example 5.—3-chloro-as-triazin-5(4H)-one

Following the procedure set forth in Example 3 but substituting an equivalent amount of chlorine for furfurylamine there is obtained 3-chloro-as-triazin-5(4H)-one.

Similarly, following the procedure of Example 3 but substituting an equivalent amount of bromine for furfurylamine yields 3-bromo-as-triazin-5(4H)-one.

Example 6.—3-amino-as-triazin-5(4H)-one

A total of 7.72 g. of 3-(methylthio)-as-triazin-5(4H)-one dissolved in 216 ml. of 28% aqueous ammonia is heated in sealed tubes at 125° for approximately 20 hours. After cooling and opening the tubes the solution is concentrated to a small volume and filtered. The material is dissolved in 100 ml. of 5% hydrochloric acid and polish filtered. The filtrate is neutralized to pH 7.2, causing precipitation of 3.1 g. of product, M.P. 300° (some decrease from about 265°). A further 1.1 g. of product is obtained by neutralizing the original mother liquor.

Analysis.—Calc'd for $C_3H_4N_4O$: C, 32.14; H, 3.60; N, 49.99. Found: C, 32.95; H, 3.82; N, 50.30.

Example 7.—2-mercuri-3-amino-as-triazin-5(2H)-one

To a hot solution of 1.12 g. of 3-amino-as-triazin-5(4H)-one in 60 ml. of hot dimethylformamide is added to a warm solution of 1.6 g. of mercuric acetate in 10 ml. of hot methanol. After cooling the precipitate is filtered and washed successively with water, ethanol and ether giving 1.4 g. of 2-mercuri-3-amino-as-triazin-5(2H)-one.

Similarly, following the procedure set forth in Example 7 but substituting an equivalent amount of 3-(furfurylamino)-as-triazin - 5(2H) - one for 3-amino-as-triazin-5(4H)-one yields 2-mercuri-3(furfurylamino)-as-triazin-5(2H)-one.

Similarly, following the procedure set forth in Example 7, but substituting equivalent amounts of 3-(morpholino)-as-triazin - 5(4H)-one, 3-(piperidino)-as-triazin-5(4H)-one, 3-(chloro)-as-triazin-5(4H)-one and 3-(bromo)-as-triazin-5(4H)-one, for 3-amino-as-triazin - 5(4H) - one, yields respectively 2-mercuri-3-(morpholino)-as-triazin-5(2H)-one, 2-mercuri-3-(piperidino)-as-triazin - 5(2H) one and 2-mercuri-3-(bromo)-as-triazin-5-(2H)-one.

Example 8.—3-amino-2-(tri-O-benzoylribofuranosyl)-as-triazine-5(2H)-one

To a dry suspension of 1.35 g. of 2-mercuri-3-amino-as-triazin-5(2H)-one in 100 ml. of toluene is added 7.0 g. of tri-O-benzoyl-D-ribofuranosyl chloride in 50 ml. of benzene. The mixture is distilled to remove the benzene and then refluxed for 45 minutes. On cooling, the mixture is filtered and the filtrate is concentrated to dryness and the residue picked up in chloroform. The extract is washed with dilute KI solution and water. After drying, the extract is concentrated to leave as residue 3-amino-2-(tri-O-benzylribofuranosyl)-as-triazin-5(2H)-one.

Similarly, following the procedure of Example 8 but substituting equivalent amounts of 2-mercuri-3(furfurylamino)-as-triazin-5(2H)-one;
2-mercuri-3-(piperidino)-as-triazin-5(2H)-one;
2-mercuri-3-(morpholino)-as-triazin-5(2H)-one and
2-mercuri-3-(chloro)-as-triazin-5(2H)-one for
2-mercuri-3-(amino)-as-triazin-5(2H)-one yields
3-(furfurylamino)-2(tri-O-benzoylribofuranosyl)-as-triazin-5(2H)-one;
3-(piperidino)-2(tri-O-benzoylribofuranosyl)-as-triazin-5(2H)-one;
3-(morpholino)-2-(tri-O-benzoylribofuranosyl)-as-triazin-5(2H)-one and
3-(chloro)-2-(tri-O-benzoylribofuranosyl)-as-triazin-5(2H)-one, respectively.

Example 9.—3-amino-2-ribofuranosyl-as-triazin-5(2H)-one

A solution of 3-amino-2-(tri-O-benzoylribofuranosyl)- as-triazin-5(2H)-one in methanol saturated at 5° with ammonia is held for three days at room temperature. After concentration to dryness the residual sirup is picked up in water and the extract washed with ether. The aqueous solution is concentrated to dryness and the residue dissolved in absolute ethanol and reconcentrated. This operation is repeated several times to remove all traces of water. Recrystallization of the residue from absolute ethanol gives 3-amino-2-ribofuranosyl-as-triazin-5(2H)-one (3-aminoazauridine).

Similarly, following the procedure set forth in Example 9, but substituting equivalent amounts of 3-(furfurylamino)-2-(tri-O-benzoylribofuranosyl)-as-triazin-5(2H)-one,
3-(piperidino)-2-(tri-O-benzoylribofuranosyl)-as-triazin-5(2H)-one;
3-(morpholino)-2-(tri-O-benzoylribofuranosyl)-as-triazin-5(2H)-one and
3-chloro-2-(tri-O-benzylribofuranosyl)-as-triazin-5(2H)-one for
3-amino-2-(tri-O-benzoylribofuranosyl)-as-triazin-5(2H)-one yields
3-(furfurylamino)-2-ribofuranosyl-as-triazin-5(2H)-one (3-furfurylamino azauridine);
3-(piperidino)-2-ribofuranosyl-as-triazin-5(2H)-one (3-piperidino azauridine);
3-(morpholino)-2-ribofuranosyl-as-triazin-5-(2H)-one (3-morpholino azauridine); and
3-chloro-2-ribofuranosyl-as-triazin-5(2H)-one (3-chloro azauridine).

This invention may be variously otherwise embodied within the scope of the appended claims.

What is claimed is:
1. A compound of the formula

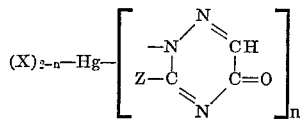

wherein Z is selected from the group consisting of halogen, amino, furfurylamino, morpholino and piperidino; X is an anion; and *n* is a positive integer less than 3.

2. The compound of claim 1 having the name 2-mercuri-3-amino-as-triazin-5(2H)-one.

3. A compound of the formula

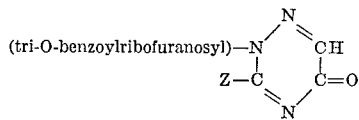

wherein Z is selected from the group consisting of halogen, amino, furfrylamino, morpholino and piperidino.

4. The compound of claim 3 having the name 3-(furfurylamino)-2-(tri-O-benoylribofuranosyl)-as-triazin-5-(2H)-one.

5. The compound of claim 3 having the name 3-amino-2 - (tri - O - benzoylribofuranosyl) - as - triazin - 5(2H)-one.

6. A compound of the formula

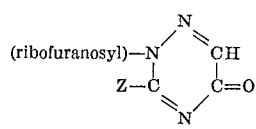

wherein Z is selected from the group consisting of halogen, amino, furfurylamino, morpholino and piperidino.

7. The compound of claim 6 having the name 3-amino-2-ribofuranosyl-as-triazin-5(2H)-one.

8. The compound of claim 6 having the name 3-chloro-2-ribofuranosyl-as-triazin-5(2H)-one.

9. The compound of claim 6 having the name 3-(furfurylamino)-2-ribofuranosyl-as-triazin-5(2H)-one.

10. 3-(furfurylamino)-as-triazin-5(2H)-one.

References Cited
UNITED STATES PATENTS 3,135,737  6/1964  Restivo _____ 260—211.5

FOREIGN PATENTS 755,036  8/1956  Great Britain.

LEWIS GOTTS, *Primary Examiner.*

J. R. BROWN, *Assistant Examiner.*